United States Patent [19]

Wize et al.

[11] 4,169,615

[45] Oct. 2, 1979

[54] SEAT BELT SECURING DEVICE

[75] Inventors: Gary A. Wize, Washington; Louis P. Garvey, West Bloomfield, both of Mich.

[73] Assignee: General Motors Corporation, Detroit, Mich.

[21] Appl. No.: 847,837

[22] Filed: Nov. 2, 1977

[51] Int. Cl.² ............................................. B60R 21/10
[52] U.S. Cl. .............................. 280/801; 24/230 AT; 24/241 PP
[58] Field of Search ............................. 280/747, 744; 24/230 AT, 230 AP, 233, 241 PP, 241 SB, 164, 232 R; 297/385, 388, 389

[56] References Cited

U.S. PATENT DOCUMENTS

| 3,013,517 | 12/1961 | Isham | 24/232 R |
| 3,179,997 | 4/1965 | Jalinaud | 24/230 AT |
| 3,294,444 | 12/1966 | Anderson | 297/385 |
| 3,754,775 | 8/1973 | Williams | 280/747 |

Primary Examiner—Robert R. Song
Attorney, Agent, or Firm—Charles E. Leahy

[57] ABSTRACT

A belt securing device includes a housing having a pair of pivotally mounted tong arms, each having a curved arm portion extending outwardly therefrom for capturing encirclement of the belt. A spring acts on the tong arms to bias the curved arm portions to an open spaced-apart belt-releasing position. An actuating member is slidably mounted on the housing and has an actuating bar positioned between the curved arm portions of the tong arms and in the path of entry of the belt therebetween. One of the tong arms has an operating leg which extends into engagement with the actuating member so that movement of the actuating member relative the housing by the occupant or the belt as the belt is entered between the tong arms pivots the tong arm against the spring bias to carry the tong arms to a closed position of belt encirclement. Gear teeth provided on the tong arms are interengaged to effect simultaneous movement of the tong arms. A latch member is pivotally mounted on the housing and has a latch spring acting thereon to urge a latch portion into blocking engagement of abutment surfaces on the tong arms to block return of the tong arms from the closed position to the open position. The latch member has a button portion by which the seat occupant may pivot the latch member against the bias of the latch spring to move the latch portion from blocking engagement of the abutment surfaces and allow the spring to pivot the tong arms to the open position to release the belt.

3 Claims, 8 Drawing Figures

SEAT BELT SECURING DEVICE

The invention relates to an improved securing device for releasably securing a seat belt in an occupant restraining position.

This invention provides an improvement in the seat belt securing device of U.S. patent application Ser. No. 776,626, entitled Seat Belt System and Securing Device, by Gary A. Wize and assigned to the assignee of this invention. According to that invention, a seat belt securing device is comprised of a housing having a pair of pivotally mounted tong arms for movement between an open spaced-apart belt-receiving position and a closed belt capturing position. One tong arm overlies the other and each has an operating leg which extends into engagement with an actuating member mounted on the housing for sliding movement and disposed in the path of belt entry between the tong arms. Longitudinal sliding movement of the actuating member pivots the tong arms to the closed position.

The present invention relates to improvements in the aforedescribed seat belt securing device and more particularly provides interengaging gear teeth on the tong arms and an operating leg on only one of the tong arms engaging the actuating member.

This improvement in the seat belt securing device eliminates one of the frictional points of engagement between the tong arms and actuating member to reduce the frictional resistance to closing of the tong arms. Furthermore, the provision of interengaging gear teeth acting between the tong arms assures simultaneous arrival of both tong arms at the closed positions wherein the locking portion of the latch member achieves locking engagement and also permit coplanar mounting of the tong arms to enable a thinner and more compact structure.

According to the present invention, a belt securing device includes a housing having a pair of pivotally mounted tong arms, each having a curved arm portion extending outwardly therefrom for capturing encirclement of the belt. A spring acts on the tong arms to bias the curved arm portions to an open spaced-apart belt-releasing position. An actuating member is slidably mounted on the housing and has an acutating bar positioned between the curved arm portions of the tong arms and in the path of entry of the belt therebetween. One of the tong arms has an operating leg which extends into engagement with the actuating bar of the actuating member so that movement of the actuating bar relative the housing by the occupant or the belt as the belt is entered between the tong arms pivots the tong arm against the spring bias to carry the curved arm portion to a closed position of belt capturing encirclement. Gear teeth provided on the tong arms are interengaged to effect simultaneous movement of the tong arms. A latch member is pivotally mounted on the housing and has a latch spring acting thereon to urge a latch portion into blocking engagement of abutment surfaces on the tong arms to block return of the tong arms from the closed position to the open position. The latch member also has a button portion by which the seat occupant may pivot the latch member against the bias of the latch spring to move the latch portion from blocking engagement of the abutment surfaces and allow the spring to pivot the tong arms to the open position to release the belt.

The object, feature and advantage of the invention is the provision of a belt securing device having a pair of tong arms for capturing a belt, an actuating member positioned in the path of belt entry between the tong arms and coacting with one of the tong arms and interengaging gear teeth on the tong arms for effecting simultaneous movement of the tong arms.

These and other objects, features and advantages of the invention will become apparent upon consideration of the specification and the appended drawings in which.

Figure 1:
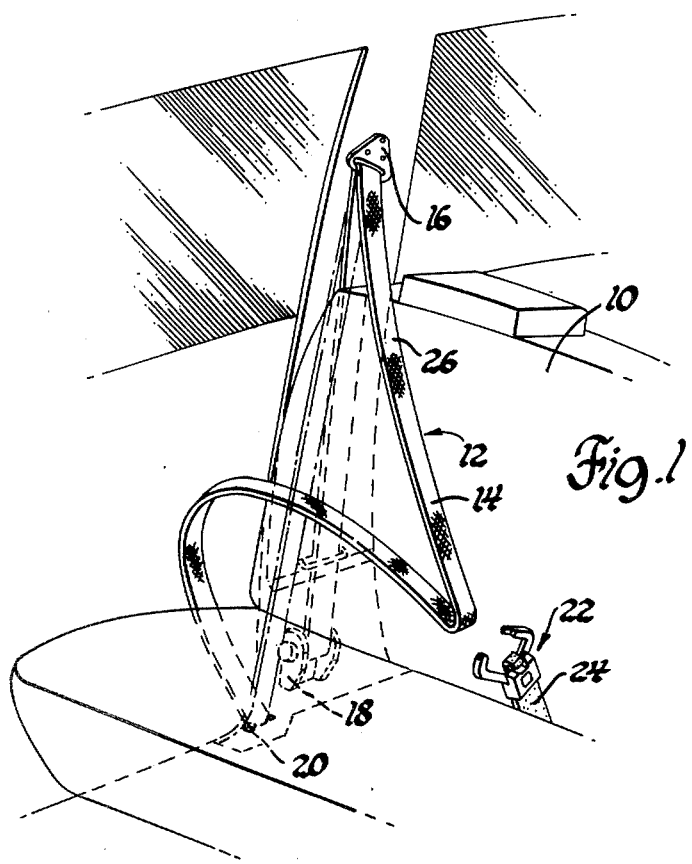
FIG. 1 is a perspective view of a seat belt system embodying the invention.

Referring to FIG. 1, there is shown a vehicle occupant compartment wherein the vehicle seat 10 is conventionally arranged. A seat belt system, generally indicated at 12, is provided for restraining a vehicle occupant in the seated position.

The seat belt system 12 includes a single loop of seat belt 14 which has its upper end slidable through an anchor loop 16 attached to the pillar and extending downwardly parallel with the pillar for connection to an inertia responsive seat belt retractor 18. The other end of the seat belt 14 is conventionally attached to the vehicle body floor pan or body sill by an anchor bracket 20. The retractor 18 winds the belt 14 to the phantom-line indicated position of FIG. 1 wherein the belt is stored in a vertically extending position at the end of the seat to permit ease of occupant ingress and egress.

A seat belt securing device, generally indicated at 22, is located inboard the occupant seating position and is attached to the vehicle body by a length of strap 24. The securing device 22 encircles and captures the belt 14 in the occupant restraint position wherein the belt 14 is divided into a shoulder belt portion 26 diagonally positioned across the chest of the occupant and a lap belt portion 27 which crosses the lap of the occupant.

Figure 2:
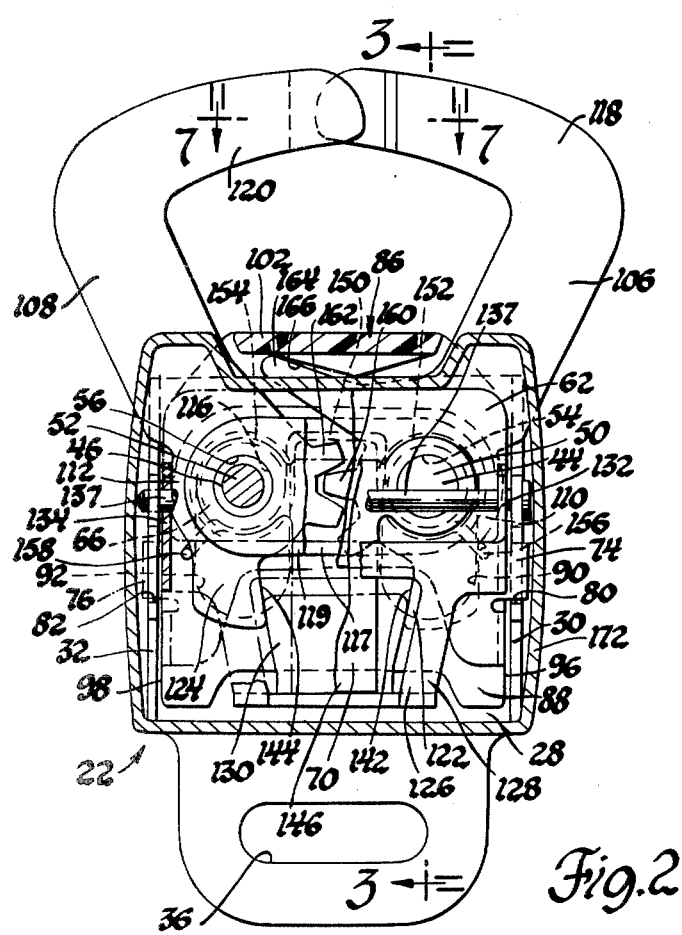
FIG. 2 is a plan view having parts broken away in section of a belt securing device according to the invention and shown in the closed position for capturing encirclement of a seat belt.
Figure 3:
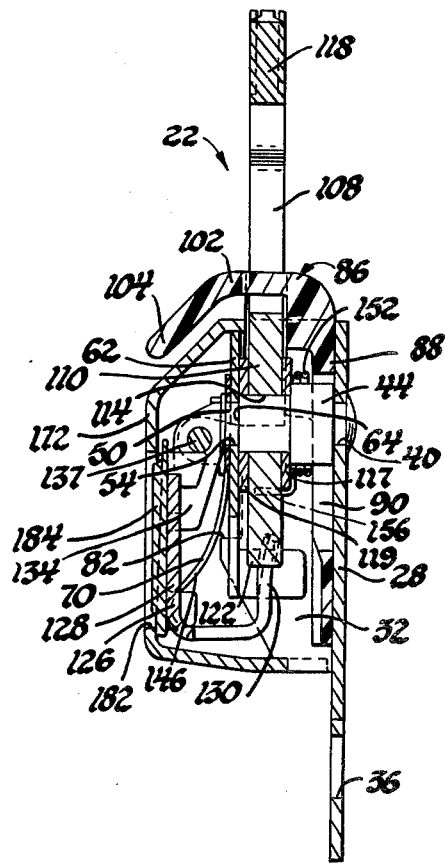
FIG. 3 is a sectional view taken in the direction of arrows 3—3 of FIG. 2.

Referring to FIGS. 2 and 3, it is seen that the securing device 22 includes a sheet metal stamping housing base 28 having laterally spaced upstanding sidewalls 30 and 32. The lower end of the housing base 28 has a slot 36 for receiving the strap 24 of FIG. 1. The housing base 28 also has an aperture 40 which receives a headed mounting pin 44. A like aperture receives a headed mounting pin 46. The distal ends 50 and 52 of the pins 44 and 46 extend through aligned apertures 54 and 56 of a housing plate 62 and are necked down to provide shoulders 64 and 66 which engage against the housing plate 62. The distal ends 50 and 52 of the pins 44 and 46 also extend through aligned apertures of a leaf spring 70 and are peened over or receive a screw by which the leaf spring 70 and housing plate 62 are mounted in parallel extending spaced relation from the housing base 28. The housing plate 62 also has lateral tabs 74 and 76 which extend into mating recesses 80 and 82 of the upstanding sidewalls 30 and 32 to provide a further supporting connection between the housing plate 62 and housing base 28.

An actuating member 86 is mounted for sliding movement relative the housing. As seen in FIGS. 2 and 3, the actuating member 86 is of injection molded plastic and has a base plate 88 which bears on the housing base 28. The base plate 88 has slots 90 and 92 which are aligned with the pins 44 and 46 to permit sliding movement of the actuating member 86 relative the housing. As seen in FIG. 2, the actuating member also has lateral walls 96 and 98 which are juxtaposed with the upstanding sidewalls 30 and 32 of housing base 28 to guide the sliding movement of actuating member 86. The actuating member 86 has an integral actuating bar 102 which extends laterally from the base plate 88 and a button portion 104, as will be discussed hereinafter.

Figure 6:
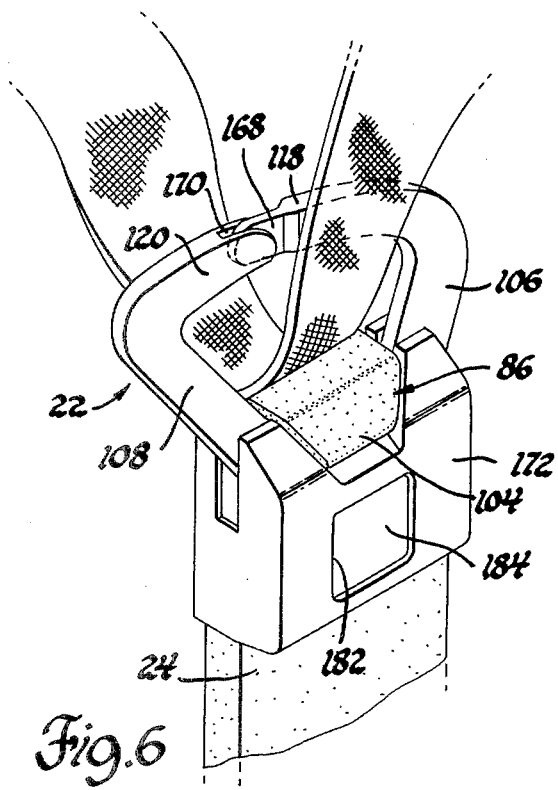
FIG. 6 is an enlarged view similar to FIG. 1 but showing the belt securing device in its closed position of belt capturing encirclement.

Referring to FIG. 6, it is seen that the securing device 22 includes a pair of tong arms 106 and 108 which encircle and capture the belt 14. As best seen in FIGS. 2 and 3, the tong arms 106 and 108 respectively include central portions 110 and 112 having apertures 114 and 116 which permit their respective engagement over the pins 44 and 46 in interposition between a bearing shim 117 seating on shoulders of the pins 44 and 46 and a bearing shim 119 captured by the housing plate 62. The tong arms 106 and 108 are coplanar and have respective outwardly extending arms 118 and 120 which curve toward one another and assume a closed position as shown in FIGS. 2 and 6 for capturing encirclement of the belt 14. The tong arms 106 and 108 also have respective inner arms 122 and 124 which assume the spaced-apart position of FIG. 2 when the arms 118 and 120 are in their closed positions.

A latch member 126 is provided to maintain the tong arms 106 and 108 in their closed positions of FIG. 2. As best seen in FIG. 3, the latch member 126 includes a push button portion 128 and a latching portion 130. The latch member 126 has laterally spaced depending tabs 132 and 134 which have apertures receiving a pivot shaft 137 which extends between the upstanding sidewalls 30 and 32. The leaf spring 70 has a curled leaf 146 which biases and maintains the latch member 126 in a normal position of FIGS. 2 and 3 in which the latching portion 130 extends into blocking engagement of abutment surfaces 142 and 144 provided on the inner arms 122 and 124 of the arms 106 and 108. The curled leaf 146 of leaf spring 70 yields to permit pivotal movement of the latch member 126 to the position of FIG. 5 wherein the latching portion 130 is withdrawn from blocking engagement between the abutment surfaces 142 and 144 of tong arm inner portions 122 and 124 to permit pivotal motion of the tong arms to their open spaced-apart belt-releasing position shown in FIG. 4.

Figure 4:
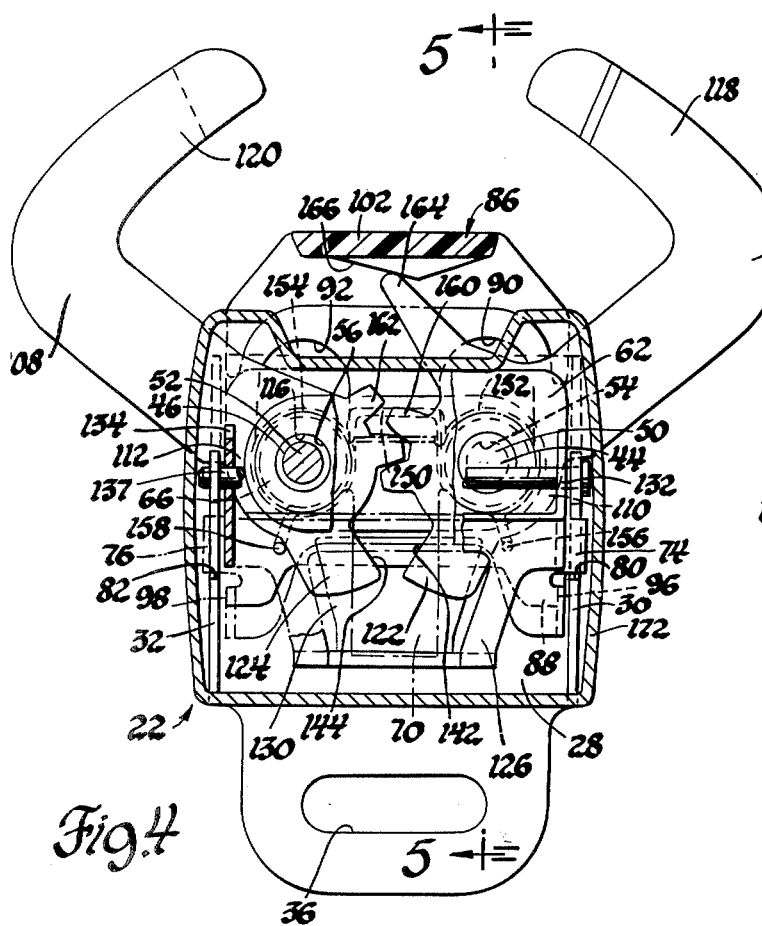
FIG. 4 is a view similar to FIG. 2 but showing the belt securing device in its open belt-releasing position.

A torsion spring assembly 150 has a pair of separate coils 152 and 154 which respectively encircle the pins 44 and 46 and have legs 156 and 158 extending into respective engagement of the inner arms 122 and 124 to simultaneously bias the tong arms 106 and 108 to their open belt-releasing positions of FIG. 4.

The central portions 110 and 112 of the tong arms 106 and 108 have respective gear teeth 160 and 162 which engage one another to effect simultaneous rotation of the tong arms between their open and closed positions.

Figure 7:
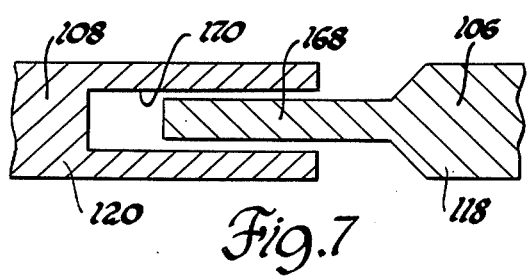
FIG. 7 is a sectional view taken in the direction of arrows 7—7 of FIG. 2.
Figure 8:
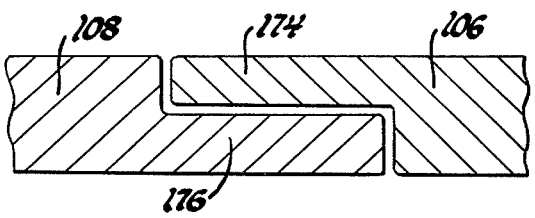
FIG. 8 is a view similar to FIG. 7 but showing an alternate structure.

Referring to FIGS. 6 and 7, it is seen the distal end of tong arm 106 is necked down to provide a tongue 168 which is received within a mating groove 170 formed in the end of tong arm 108. An alternative structure is shown in FIG. 8 where the tong arms 106 and 108 have offset tongues 174 and 176 which overlie one another.

Figure 5:
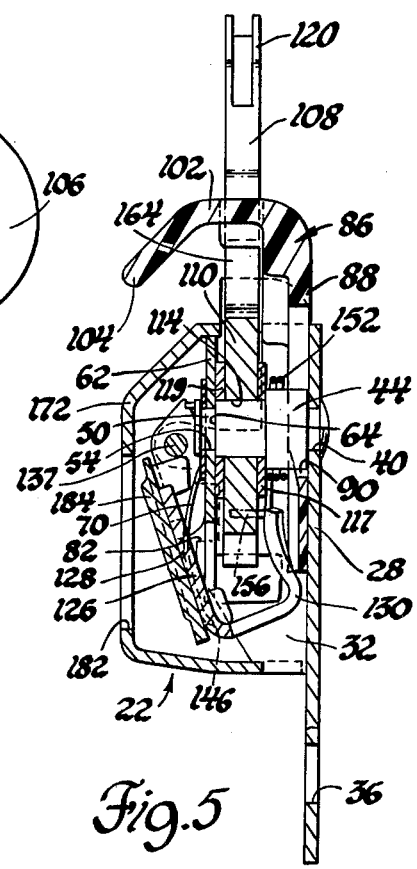
FIG. 5 is a sectional view taken in the direction of arrows 5—5 of FIG. 4.

As best seen in FIG. 4, the tong arm 106 has an operating leg 164 which projects from the central portion 110 into engagement of a ramped surface 166 of the actuating bar 102 of the actuating member 86 to induce pivotal movement of the tong arm 106 to the closed position upon sliding movement of the actuating member 86 from the position of FIGS. 4 and 5 to the position of FIGS. 2 and 3.

It will be appreciated that the relative motion between the actuating member 86 and the tong arms 106 and 108 is coordinated by the torsion spring assembly 150, the operating leg 164 of tong arm 106 and the gear teeth 160 and 162 interconnecting the tong arms 106 and 108. For example, as seen in FIG. 4, the effort of the torsion spring assembly 150 urges both tong arms to their open spaced-apart position wherein the operating leg 164 maintains the actuating member 86 in an extended position wherein the actuating bar 102 partially closes the space between the tong arms 106 and 108. Furthermore, retracting movement of the actuating member 86 causes the ramped surface 166 of actuating bar 102 to forcibly bear on the tong arm operating leg 164 so that the tong arm 106 is pivoted to its closed positions of FIG. 2 while the gear teeth 160 and 162 simultaneously pivot the tong arm 108 to its closed position.

As best seen in FIGS. 2 and 3, a stamped sheet metal cover 172 encloses the latch member 126 and has an opening 182 which provides access to a decorative escutcheon 184 attached to the push button portion 128.

OPERATION

Referring again to FIG. 1, it will be understood that the occupant seating position shown is at the right hand or passenger side of the vehicle. The seat belt 14 is normally stored in the phantom-line indicated position extending vertically along the pillar. When an occupant enters the seat and wishes to engage the belt system in its restraining position, the occupant turns somewhat toward the pillar and reaches with his left hand to grasp the belt. The belt 14 is conveniently looped over the thumb so that the belt slides over the thumb as the belt is unwound from retractor 18 and pulled through the anchor loop 16. As seen in FIG. 4, the actuating bar 102 of the actuating member 86 extends outwardly of the housing and partially fills the open space between the tong arms 106 and 108. The actuating member 86 is maintained in this extended position by the cooperative effort of the engagement of the operating leg 164 of tong arm 106 with the actuating bar 102 and the bias of the torsion spring assembly 150 which holds the tong arms in their open spaced-apart position of FIG. 4.

After the occupant enters the belt 14 between the tong arms 106 and 108, the tong arms are moved from their open spaced-apart position of FIG. 4 to the closed position of belt capturing encirclement of FIG. 2 by the application of force against the actuating member 86. This actuating force may be applied by the thumb as it bears on the button portion 104 through the intermediary of the belt or it may be applied by thrusting the belt against the actuating bar 102. In either case, the sliding movement of the actuating member 86 in the retracting direction with respect to housing moves the operating leg 164 to pivot the tong arm 106 about pin 44 while the interengaged gear teeth 160 and 162 simultaneously pivot tong arm 108 about pin 46. When the tong arms reach the closed position of FIG. 2, the latch member 126 is pivoted from its position of FIG. 5 to its position of FIG. 3 by leaf spring 70 to carry its latching portion 130 into blocking engagement of the abutment surfaces 142 and 144 of the tong arms.

The occupant may also engage the belt in the securing device 22 by using the fingers of either hand to squeeze together the tong arms 106 and 108 in which case the interengaged gear teeth 160 and 162 assure their simultaneous arrival at the closed position.

When the occupant wishes to alight from the vehicle, the latch member 126 is pivoted to its position of FIG. 5 by pressing against the push button portion 128 with the thumb. Movement of the latch member 126 to the position of FIG. 5 removes the latching portion 130 from blocking engagement between the abutment surfaces 142 and 144 of the tong arms. The torsion spring assembly 150 may then pivot the tong arms 106 and 108 from their closed position of FIG. 2 to the open position of FIG. 4 which releases the belt for movement to the stored position by the winding effort of retractor 18. Opening movement of the tong arm 106 causes the operating leg 164 to extend the actuating member 86 outwardly from the housing to the extended position of FIG. 4 in readiness for a subsequent donning of the restraint belt.

Accordingly, it is seen that the invention provides a securing device and a belt system therefor which facilitates one-handed securement of the belt loop in a restraining position in response to belt entry between belt capturing tong arms independently of any cooperating securing elements mounted on the belt to thereby permit winding of the belt to the stored position by a low effort retractor which enhances occupant comfort.

The embodiments of the invention in which an exclusive property or privilege is claimed are defined as follows:

1. In a seat belt system having a loop of restraint belt, a securing device for releasably securing the belt in restraining position about the occupant, said securing device comprising:

a housing, first and second tong arms having curved arm portions extending outwardly of the housing and defining a space therebetween for encirclement of the belt, first and second pivot means provided on the housing and respectively pivotally mounting the tong arms for movement between an open spaced-apart belt-releasing position and a closed belt capturing position encircling the belt, a plurality of interengaged gear teeth provided on the first and second tong arms to coordinate movement of the first and second tong arm in both the opening and closing directions through the entire range of pivotal movement between the open and closed positions, an actuating member movably mounted on the housing and cooperably associated with only one of the tong arms so that movement of the actuating member relative the housing pivots the one tong arm to the closed position and the interengaged gear teeth pivot the other tong arm to the closed position.

2. In a vehicle body seat belt system having a loop of restraint belt, a securing device for releasably capturing the belt in restraining position about the occupant independently of any cooperating securing element carried on the belt and comprising: a housing mounted on the vehicle body, first and second tong arms pivotally mounted on the housing and having belt capturing curved arm portions extending outwardly of the housing for capturing encirclement of the belt, spring means acting on at least the first tong arm to bias the curved arm portion into an open belt-releasing position, an actuating member movably mounted on the housing and extending outwardly therefrom in the path of entry of the belt between the tong arms, said actuating member being operatively associated with only the first tong arm so that movement of the actuating member relative the housing by the occupant or the belt pivots only the first tong arm against the bias of the spring means to a closed position, a plurality of gear teeth provided on the first and second tong arms and engaged with one another to coordinate movement of the first and second tong arm in both the opening and closing directions through the entire range of pivotal movement between the open and closed positions, said gear teeth being effective to obtain simultaneous movement of the tong arms by the actuating member to the closed position encircling and capturing the belt in the restraining position and by the spring means to the open spaced-apart belt-releasing position, and releasable latch means for maintaining the tong arms in the closed position.

3. In a vehicle body seat belt system having a loop of restraint belt, a securing device for releasably capturing the belt in restraining position about the occupant, said securing device comprising: a housing mounted on the vehicle body, a pair of tong members having arm portions extending outwardly of the housing and curved toward one another to define a space therebetween for capturing encirclement of the belt, pivot means mounting the tong members on the housing for pivotal movement between an open spaced-apart belt-releasing position and a closed position for capturing the belt in the occupant restraining position, a plurality of gear teeth provided on the tong arms and meshing with one another to effect simultaneous movement of both tong members in both the opening and closing directions through the entire range of pivotal movement between the fully open and fully closed positions, spring means acting on at least one of the tong members and cooperating with the gear teeth to bias both tong members to an open spaced-apart belt-releasing position, an actuating member slidably mounted on the housing for movement between an extended position and a retracted position and having an actuating portion positioned between the curved arm portions of the tong members, an operating leg on only one of the tong members extending into engagement with the actuating portion so that movement of the actuating member from the extended position to the retracted position and cooperation of the gear teeth effects simultaneous pivotal movement of both tong members to a closed position encircling and capturing the belt in the occupant restraining position, and releasable latch means for maintaining the tong members in the closed position.

* * * * *